US009979998B1

(12) United States Patent
Pogue et al.

(10) Patent No.: US 9,979,998 B1
(45) Date of Patent: May 22, 2018

(54) SYSTEM FOR TIME SYNCHRONIZATION OF AUDIO DEVICES

(71) Applicant: AMAZON TECHNOLOGIES, INC., Seattle, WA (US)

(72) Inventors: Michael Alan Pogue, Sunnyvale, CA (US); Kyle Gordon Haight, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/584,873

(22) Filed: May 2, 2017

(51) Int. Cl.
*H04L 7/00* (2006.01)
*H04N 21/43* (2011.01)
*H04L 12/28* (2006.01)
*H04N 21/8547* (2011.01)
*H04N 21/436* (2011.01)
*H04N 21/4363* (2011.01)
*H04J 3/06* (2006.01)
*G06F 3/16* (2006.01)
*G06F 17/30* (2006.01)
*G11B 27/10* (2006.01)
*H04L 29/06* (2006.01)

(52) U.S. Cl.
CPC ......... *H04N 21/4307* (2013.01); *G06F 3/162* (2013.01); *H04J 3/0632* (2013.01); *H04J 3/0638* (2013.01); *H04L 12/2807* (2013.01); *H04N 21/43615* (2013.01); *H04N 21/43637* (2013.01); *H04N 21/8547* (2013.01); *G06F 3/165* (2013.01); *G06F 17/3074* (2013.01); *G11B 27/10* (2013.01); *H04L 65/60* (2013.01); *H04L 2012/2849* (2013.01)

(58) Field of Classification Search
CPC ........... H04N 21/4307; H04N 21/8547; H04N 21/43615; H04N 21/43637; H04L 12/2807; H04L 65/60; H04L 2012/2849; H04J 3/0638; H04J 3/0632; G06F 3/162; G06F 3/165; G06F 17/3074; G11B 27/10
USPC ................................. 375/356, 354, 357, 358
See application file for complete search history.

(56) References Cited

U.S. PATENT DOCUMENTS

| | | | | |
|---|---|---|---|---|
| 7,280,550 | B1 * | 10/2007 | Rosenboom | .......... H04J 3/0682 370/404 |
| 8,571,005 | B1 * | 10/2013 | Vleugels | ................... G06F 5/16 370/350 |
| 2007/0038999 | A1 * | 2/2007 | Millington | ............ H04J 3/0664 718/100 |

(Continued)

*Primary Examiner* — Phuong Phu
(74) *Attorney, Agent, or Firm* — Lindauer Law, PLLC

(57) ABSTRACT

Described are techniques for synchronizing multiple devices within a group to enable performance of a synchronized action through the exchange of time data. A first device provides a timestamp or other time data to multiple other devices via a multicast transmission. Each of the other devices determines a time at which the timestamp was received and exchanges this data with one another. Based on the determined times, the other devices may be synchronized relative to a selected synchronization master device. One of the other devices may then determine a from the first device, and determine the time at which the timestamp from the first device was received, enabling the first device to be synchronized with the synchronization master device. Devices that are unable to receive multicast transmissions from the first device may exchange timestamps with the first device via an access point.

20 Claims, 6 Drawing Sheets

(56) References Cited

U.S. PATENT DOCUMENTS

| | | | |
|---|---|---|---|
| 2014/0269757 A1* | 9/2014 | Park | H04L 49/201 370/432 |
| 2014/0355629 A1* | 12/2014 | Ito | H04L 7/0008 370/509 |
| 2016/0301831 A1* | 10/2016 | Meyer | H04N 21/242 |
| 2016/0302166 A1* | 10/2016 | Dang | H04W 56/001 |

* cited by examiner

SYSTEM FOR TIME SYNCHRONIZATION OF AUDIO DEVICES

BACKGROUND

When using a group of audio devices to generate a synchronized audio output, the timing of the output by each device relative to each other device may be controlled to synchronize the output.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
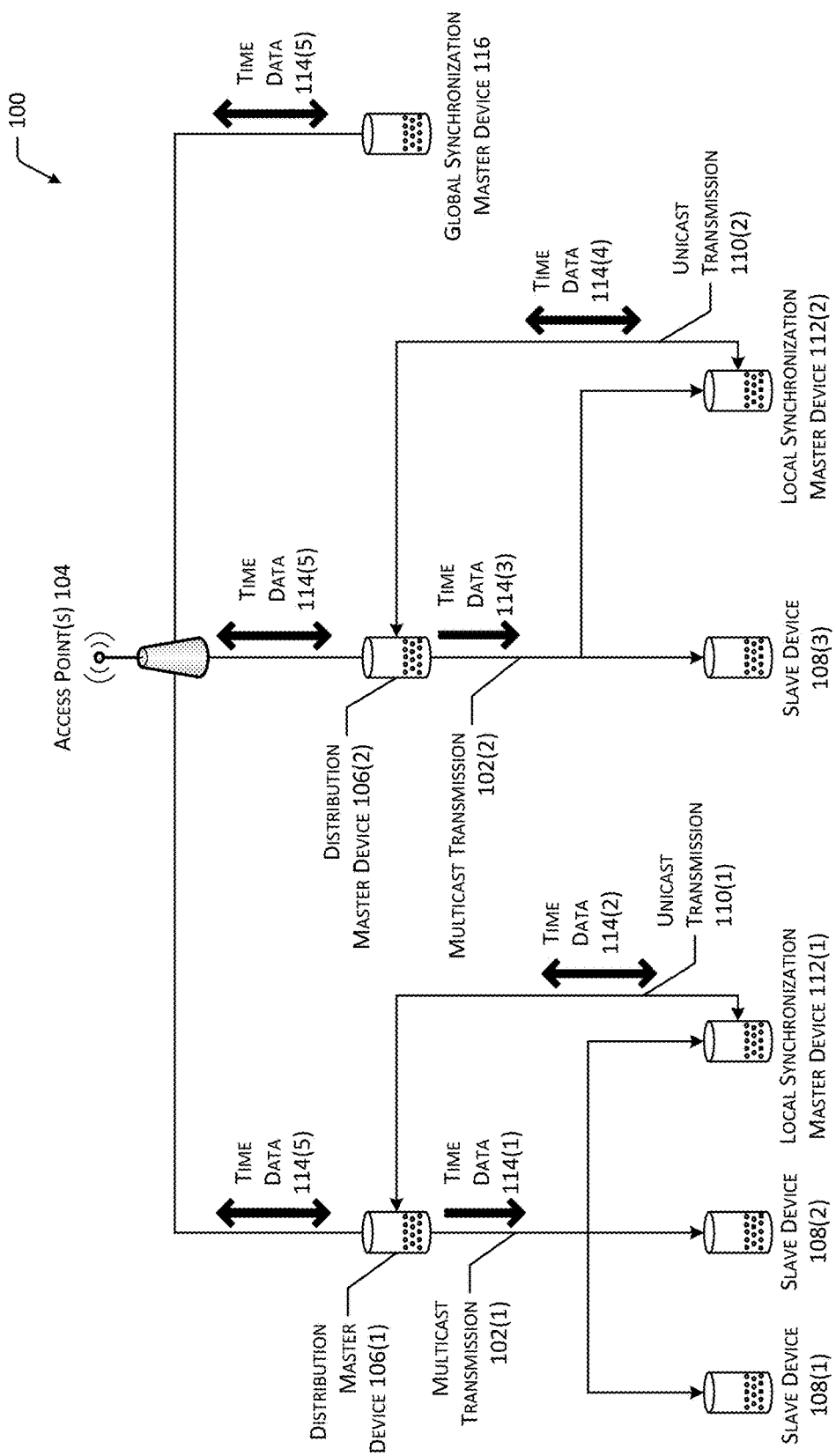
FIG. 1 depicts an implementation of a system for synchronizing a group of audio devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An audio system may include multiple audio devices that communicate with one another via one or more networks, which may be used to provide a synchronized audio output to users within an environment. For example, a user within a home may select a particular group of audio devices, such as a set of audio devices within a particular room of the home, a set of audio devices located on a particular floor of the home, or all of the audio devices associated with the home. The user may also select a particular audio application to be used or particular audio content for output. Based on the characteristics of each audio device, the timing, volume, or particular portions of the audio output associated with each audio device may be configured.

For example, each audio device within a group may include a respective clock or timer. Typically, the timer value for a device may be set to zero at or proximate to the time that the device is initially activated. Then, the timer counts forward in particular incremental units of time, based on the characteristics of the timer, until the device is deactivated or rebooted, at which time the timer may be reset to zero. Each audio device within a group of devices may be activated at a different time and may include timers having different characteristics. Therefore, the timer values associated with each audio device within the group may differ by certain amounts. Additionally, the timer values associated with each audio device may increment at slightly different rates, which may cause the differences between timer values to change over time. To synchronize output from each of the devices, a timer value for a particular device may be associated with one or more corresponding timer values of other devices. In some cases, each audio device within a group may determine the difference between its own timer value and the timer value for a selected audio device, dubbed the time synchronization master device.

In some cases, multiple audio devices may communicate using one or more access points, such as via a Wi-Fi network or one or more other types of networks. Example implementations for forming a group of audio devices that transmit audio data using one or more access points are described in U.S. patent application Ser. No. 15/245,897, filed Aug. 24, 2016, entitled "System for Configuring Distributed Audio Output Using an Access point", which is incorporated by reference herein in its entirety. The audio devices may periodically transmit timestamps indicative of a current timer value for the audio device to one or more other audio devices. The other audio device(s) may determine a timestamp indicative of a current timer value at the time that the timestamp from the sending device was received. Based on the timestamp values exchanged between the audio devices, the relative differences between the timer values for the audio devices may be determined and used to synchronize an output using the group of audio devices. However, the transmission of timestamps may be affected by various delays when being transmitted from a sending device, when received by an access point, when processed by the access point, when transmitted from the access point, and when received by a receiving device.

In other cases, a group of audio devices may be configured to communicate directly with one another. For example, a master device may be configured to provide audio data to multiple slave devices simultaneously via a multicast transmission. The slave devices may provide requests for retransmission of any unreceived packets of audio data to the master device via a unicast transmission, a multicast transmission, or via an access point, responsive to which the master device may retransmit packets that were not received by one or more slave devices in a subsequent multicast transmission. Example implementations for forming a group of audio devices in which a master device communicates audio data to multiple slave devices via a multicast transmission are described in U.S. patent application Ser. No. 15/246,070, filed Aug. 24, 2016, entitled "System for Configuring Distributed Audio Output using a Designated Audio Device", which is incorporated by reference herein in its entirety. Other example implementations for distributing audio data to a group of audio devices using multicast transmissions are described in U.S. patent application Ser. No. 15/357,579, filed Nov. 21, 2016, entitled "System for Distributing Audio Output Using Multiple Devices", which is incorporated by reference herein in its entirety.

In some cases, a group of audio devices may communicate audio data using a combination of multicast transmissions and transmissions via an access point. For example, multiple groups of audio devices that include a master device configured to transmit to slave devices, may communicate with one another via an access point. Continuing the example, one or more additional audio devices that are not configured to transmit or receive multicast transmissions may also communicate with the other audio devices via the access point. Example implementations for forming such a group of audio devices are described in U.S. patent application Ser. No. 15/373,677, filed Dec. 9, 2016, entitled "System for Configuring Audio Devices to Distribute Audio Data", and in U.S. patent application Ser. No. 15/421,014, filed Jan. 31, 2017, entitled "System for Distributed Audio Output Using Designated Audio Devices". application Ser. Nos. 15/373,677 and 15/421,014 are incorporated by reference herein in their entirety.

Described in this disclosure are techniques for efficiently synchronizing a process performed by multiple devices, such as the output of content associated with audio devices or other types of devices, that account for the manner in which the devices communicate with one another and do not interfere with the distribution of content among the devices. For example, if a first device (e.g., a master device) is configured to transmit data to multiple other devices (e.g., slave devices) via a multicast transmission, the multicast transmission may be used as a simultaneous event to synchronize the receiving devices relative to each other. Continuing the example, a first device may provide first time data to multiple receiving devices via a multicast transmission. The first time data may include a timestamp or other indication of a timer value indicating a time when the first time data was transmitted, as measured by the first device. Each receiving device may determine time data, such as a timestamp or other type of timer value, indicative of the time that the first time data was received, as measured by the respective receiving device. For example, the time data generated by a first receiving device ("B") may be represented by an ordered pair of values indicative of the timestamp provided by the first device ("A") and the timestamp of the first receiving device indicative of the time that the first timestamp was received, such as "(A, B)". The time data generated by a second receiving device ("C") may similarly be represented by an ordered pair of values indicative of the timestamp of the first device and the timestamp of the second receiving device indicative of the time that the first timestamp was received, such as "(A, C)". In other implementations, multiple devices may be synchronized using another type of simultaneous event that is detectable by the devices. For example, two or more audio devices may simultaneously detect a transmission, a visible element, an audible element, a haptic element, and so forth, and responsive to the detection of this event, each device may determine a corresponding timer value.

The receiving devices may then exchange the generated time data with one another, such as via a unicast transmission, a multicast transmission, a communication via an access point, or by transmitting the generated time data to the first device which may in turn transmit the generated time data to each of the receiving devices via a subsequent multicast transmission. In some cases, one or more receiving devices may send data to a particular receiving device. In other cases, multiple receiving devices may exchange time data with one another. The time data for each receiving device may be used to associate the timer values of the receiving devices relative to one another. For example, because each receiving device ("N") may receive the same timestamp from the first device, the ordered pairs of values from each receiving device would each have the format "(A, N)". In such a case, a joining operation may be performed on the time data from each receiving device, using the timestamp value for the first device as a key. The resulting values may associate the timestamp value for each receiving device with a corresponding timestamp value for a selected receiving device, designated as the time synchronization master device. The difference between the timestamp value for the time synchronization master device and that of another receiving device may determine an offset associated with an audio output. For example, if it is determined that the timer values for a particular device and the time synchronization master device differ by 150 milliseconds (ms), then when audio is output using the time synchronization master device at a certain timer value, "T", as measured by the time synchronization master device, a corresponding audio output from the particular device may be output when the timer for the particular device indicates a value of T+150, as measured by the particular device. By performing linear regression or a similar operation on multiple sets of timer values, determined over a period of time, drift values for each device relative to each other device may also be determined. By using a multicast transmission from the first device, directly to multiple receiving devices, to synchronize the receiving devices, sources of variability, jitter, or other inaccuracies associated with use of an access point may be avoided. Additionally, by using a multicast transmission from the first device, multiple receiving devices may be synchronized efficiently using a single simultaneous event.

In some implementations, one of the receiving devices, such as the time synchronization master device, may be used to synchronize the first device. For example, a multicast transmission that includes the timestamp associated with the first device may not be detectable or usable by the first device, itself, for synchronization purposes. Rather than using the initial timestamp transmitted by the first device, the time synchronization master device may exchange time data with the first device, such as via unicast transmissions. This exchange of timestamps may be used to synchronize the first device with the time synchronization master device, such as by determining a difference between the timer values represented by the timestamps. In some implementations, to facilitate the calculation of offset values (e.g., skew and drift) for each of the receiving devices the first device may transmit, to each receiving device, time data indicative of the timestamps exchanged between the time synchronization master device and the first device, such as via a multicast transmission or one or more unicast transmissions.

In some implementations, the transmission of time data and the exchange of timestamps may be performed periodically or continuously. For example, the first device may transmit time data to the receiving devices once every 100 ms, once per minute, or based on another time period. Similarly, the first device and the time synchronization master device may exchange time data in a periodic or continuous manner, such as via unicast transmissions. In some implementations, transmission of data between devices may occur as a bulk or batch process. For example, the first device and the time synchronization master device may exchange timestamps multiple times during a period of time. Subsequent to the period of time, the first device may provide data indicative of multiple timestamp exchanges to one or more of the receiving devices in a single multicast transmission. As another example, the receiving devices may determine multiple timestamps over a period of time, based on the receipt of multicast transmissions from the first device. Subsequent to the period of time, one or more of the devices may transmit multiple timestamps to one or more other devices, such as via a bulk or batch process.

In other implementations, a group of devices may be synchronized using multicast transmissions from each device. For example, in a group of three devices, a first device may provide a first timestamp to a second device and a third device via a multicast transmission. The second and third devices may determine respective times at which the first timestamp was received. The second device may provide a second timestamp to the first and third devices via a multicast transmission, and the first and third devices may determine respective times at which the second timestamp was received. In some implementations, to improve the convergence of the synchronization process, the third device may provide a third timestamp to the first and second devices, and the first and second devices may determine respective times at which the third timestamp was received. Each device may also communicate the determined times at which other timestamps were received to each of the other devices via multicast transmissions.

In some cases, a group of devices may communicate using both multicast transmissions and communications via an access point. For example, a first master device may provide audio data to a first group of slave devices via multicast transmissions. A second master device may similarly provide audio data to a second group of slave devices. The two master devices may each communicate with an access point. In some cases, one or more additional devices may also communicate with the access point. In such cases, the subsets of audio devices that are configured to transmit or receive audio data via multicast transmissions may be synchronized with respect to one another in the manner described previously. Then, each of the devices in communication with the access point may exchange time data to synchronize the devices with regard to a selected device, which may be designated as a time synchronization master device for the collective group of devices. Thus, each master device of a subset of devices may be synchronized with regard to the time synchronization master device, while each slave of a master device may be synchronized with regard to the time synchronization master device of the subset.

FIG. 1 depicts an implementation of a system 100 for synchronizing a group of audio devices. In the example system 100, FIG. 1 depicts a group of eight audio devices that are configured to receive and transmit audio data via a combination of multicast transmissions 102 and communication links with one or more access points 104. Specifically, a first subset of audio devices includes a distribution master device 106(1) configured to provide audio data to three slave devices 108 via a multicast transmission 102(1). A second subset of audio devices includes a distribution master device 106(2) configured to provide audio data to two slave devices 108 via a multicast transmission 102(2). A third subset of audio devices includes a single audio device in communication with the access point(s) 104 that is not configured to send or receive multicast transmissions 102. For example, a particular audio device may be positioned in a location that is remote from other audio devices. To distribute audio data to the audio devices, a particular audio device may function as a global distribution master device 106 that receives the audio data from an external source, such as a server or other computing device in communication with the access point(s) 104 or a local device such as a computing device that maintains a Bluetooth communication link with the global distribution master device 106. The global distribution master device 106 may transmit the audio data to one or more other distribution master devices 106 via the access point(s) 104, and each distribution master device 106 may transmit the audio data to one or more slave devices 108 via one or more multicast transmissions 102. If a slave device 108 does not receive one or more packets of audio data, the slave device 108 may provide a retransmission request to the corresponding distribution master device 106 indicating the packets that were not received. Retransmission requests may be provided via a unicast transmission 110, a multicast transmission 102, or via the access point(s) 104. The distribution of audio data using a combination of multicast transmissions 102 and communication links with one or more access points 104 is described in application Ser. Nos. 15/373,677 and 15/421,014, incorporated by reference previously. While FIG. 1 depicts the audio devices as freestanding speaker devices, in other implementations, the audio devices may include any type of device that is capable of receiving audio data and generating an audio output. Additionally, while implementations herein are described with regard to generating an audio output using audio devices, other implementations may include the generation of any type of output using any type of device or content, such as video data, image data, alphanumeric data, and so forth.

As discussed previously, each audio device may include a clock or other type of timer device. The timer for each audio device may indicate a particular value. For example, the timer value for each audio device may begin at zero when the device is activated, then increment forward as time passes. The amount by which the timer value advances with each increment may be determined based on characteristics of the timer device, such as by measuring vibrations of a crystal. Thus, at a given moment in time, the timer values associated with each audio device may differ. Therefore, to synchronize an audio output using each of the audio devices, each audio device may determine the difference between its timer value and the timer value of a selected other audio device, which may be designated as a time synchronization master device.

For example, one of the slave devices 108 associated with first subset of audio devices may be designated as a local synchronization master device 112(1). To synchronize the slave devices 108, including the local synchronization master device 112(1), relative to one another, the distribution master device 106(1) may provide time data 114(1) to each of the slave devices 108 via a multicast transmission 102(1). The time data 114(1) may include a timestamp indicating a current timer value, as measured by the distribution master device 106(1) at the time that the time data 114(1) is transmitted. The first slave device 108(1), second slave device 108(2), and local synchronization master device 112(1) may receive the time data 114(1) and determine respective timer values, as measured by each respective receiving device, at the time that the time data 114(1) is received. Each of the slave devices 108, including the local synchronization master device 112(1), may provide these respective timer values to one another. For example, the first slave device 108(1), second slave device 108(2), and local synchronization master device 112(1) may communicate the timer values via one or more unicast transmissions 110, multicast transmissions 102, or communication links via the access point(s) 104. In some implementations, one or more of the first slave device 108(1), second slave device 108(2), or local synchronization master device 112(1) may provide the determined timer value(s) to the distribution master device 106(1), which may in turn provide the determined timer value(s) to the other slave devices 108 via one or more multicast transmissions 102. In some cases, one or more of the first slave device 108(1), second slave device 108(2), or local synchronization master device 112(1) may receive multiple multicast transmissions 102 and determine multiple corresponding timer values, over a period of time, then may provide multiple timer values to the other devices as part of a single bulk or batch process.

The first slave device 108(1) and second slave device 108(2) may determine a difference between the timer values associated with receipt of the time data 114(1) and the timer value of the local synchronization master device 112(1) at the time of the receipt of the time data 114(1). In some implementations, one or more of the first slave device 108(1), second slave device 108(2), or local synchronization master device 112(1) may store the determined timer values from each slave device 108 in a table and determine the relationship between the timer values for each slave device 108 by performing a join operation using the timer value from the time data 114(1) as a key.

While the transmission of the time data 114(1) via the multicast transmission 102(1) may be used to synchronize the first slave device 108(1), second slave device 108(2), and local synchronization master device 112(1) relative to one another, use of the time data 114(1) to synchronize the distribution master device 106(1) with the local synchronization master device 112(1) may be impossible or inaccurate. For example, in some cases, the distribution master device 106(1) may be unable to detect or utilize an outgoing multicast transmission 102 for synchronization purposes. To reduce the propensity for inaccuracy, the local synchronization master device 112(1) and distribution master device 106(1) may exchange time data 114(2) via one or more unicast transmissions 110(1). In other implementations, the local synchronization master device 112(1) and distribution master device 106(1) may exchange time data 114(2) via the access point(s) 104 or one or more multicast transmissions 102. The time data 114(2) may include timestamps indicative of a timer values for the local synchronization master device 112(1) and distribution master device 106(1) at the times that timestamps from the other device are received. For example, the local synchronization master device 112(1) may provide a request for a timestamp to the distribution master device 106(1), and may determine a first timestamp indicative of the time that the request was transmitted. The distribution master device 106(1) may provide a second timestamp to the local synchronization master device 112(1) in response to the request. The local synchronization master device 112(1) may determine a third timestamp corresponding to a timer value at the receipt of the second timestamp. Differences between the determined timer values may be used to synchronize the distribution master device 106(1) with the local synchronization master device 112(1). One example method by which the three associated time values may be used to synchronize two devices may include use of a convex hull algorithm, as described in U.S. patent application Ser. No. 15/388,258, filed Dec. 22, 2016, entitled "Time Synchronization Using Timestamp Exchanges", and in U.S. patent application Ser. No. 15/388,346, filed Dec. 22, 2016, entitled "Time Synchronization Using Timestamp Exchanges". Application Ser. No. 15/388,258 and application Ser. No. 15/388,346 are each is incorporated by reference herein in their entirety. In some implementations, the distribution master device 106(1) may provide at least a portion of the second time data 114(2) to the first slave device 108(1) and second slave device 108(2), such as via a multicast transmission 102(1) or one or more unicast transmissions 110. In some cases, one or more of the distribution master device 106(1) or the local synchronization master device 112(1) may determine multiple timer values based on the time data 114(2), and the distribution master device 106(1) may transmit the multiple timer values to the slave devices 108 via a single multicast transmission 102(1) or set of unicast transmissions 110.

Because the first time data 114(1) may not be used to synchronize the distribution master device 106(1), in some cases, the first time data 114(1) may include other types of data in addition to or in lieu of a timestamp generated by the distribution master device 106(1). For example, the transmission of the timer values determined based on the time data 114(2), the transmission of audio data, or the transmission of other types of data via the multicast transmission 102(1) to the slave devices 108 may serve as a simultaneous event that may be used to synchronize the slave devices 108 relative to one another.

In a similar manner, the second distribution master device 106(2) may provide time data 114(3) to the third slave device 108(3) and a second local synchronization master device 112(2) via a multicast transmission 102(2). The time data 114(3) may include a timestamp indicative of the time that the time data 114(3) was transmitted. The slave device 108(3) and local synchronization master device 112(2) may determine respective timer values indicative of the times that the time data 114(3) was received by each device. Both the slave device 108(3) and local synchronization master device 112(2) may provide the determined timer values to the other device such that the slave device 108(3) may be synchronized relative to the local synchronization master device 112(2). The local synchronization master device 112(2) may exchange time data 114(4) with the distribution master device 106(2) via unicast transmissions 110(2) or another type of transmission. For example, the local synchronization master device 112(2) may transmit a request for a timer value to the distribution master device 106(2), which may determine and transmit a timer value indicative of a time that the request was received. The local synchronization master device 112(2) may determine timer values at the time the request was transmitted and the time that the timer value is received from the distribution master device 106(2). Based on the difference between the timer values of the local synchronization master device 112(2) and the distribution master device 106(2), the distribution master device 106(2) may be synchronized relative to the local synchronization master device 112(2). In some implementations, the distribution master device 106(2) may provide data indicative of one or more determined timer values to the slave device 108(3) and the local synchronization master device 112(2) via a multicast transmission 102(2).

FIG. 1 depicts an additional audio device in communication with the access point(s) 104 as a global synchronization master device 116. In cases where subsets of audio devices are configured to transmit or receive multicast transmissions 102, the subsets of audio devices may be synchronized relative to one another based on the timer values of a local synchronization master device 112. However, if multiple subsets of audio devices communicate via the access point(s) 104, a global synchronization master device 116 may be used to synchronize the subsets of audio devices relative to one another. For example, the global synchronization master device 116 may exchange time data 114(5) with the first distribution master device 106(1) and the second distribution master device 106(2) via the access point(s) 104. The time data 114(5) may include timestamps indicative of timer values for the distribution master devices 106 at the time that data is received from global synchronization master device 116, and corresponding timer values of the global synchronization master device 116. Each distribution master device 106 may determine a respective timer value relative to the timer value(s) of the global synchronization master device 116. The distribution master devices 106 may transmit the respective determined timer values to the global synchronization master device 116. In some implementations, the distribution master devices 106 may transmit the respective determined timer values to one or more of the slave devices 108. When generating an audio output, each of the audio devices may be synchronized based on timer values of the global synchronization master device 116. For example, a slave device 108 may be synchronized with regard to its local synchronization master device 112. The associated distribution master device 106 may also be synchronized relative to the local synchronization master device 112. Therefore, synchronizing the distribution master device 106 relative to the global synchronization master device 116 may enable the output of the associated slave devices 108 of the distribution master device 106 to also be synchronized relative to the global synchronization master device 116.

Figure 2:
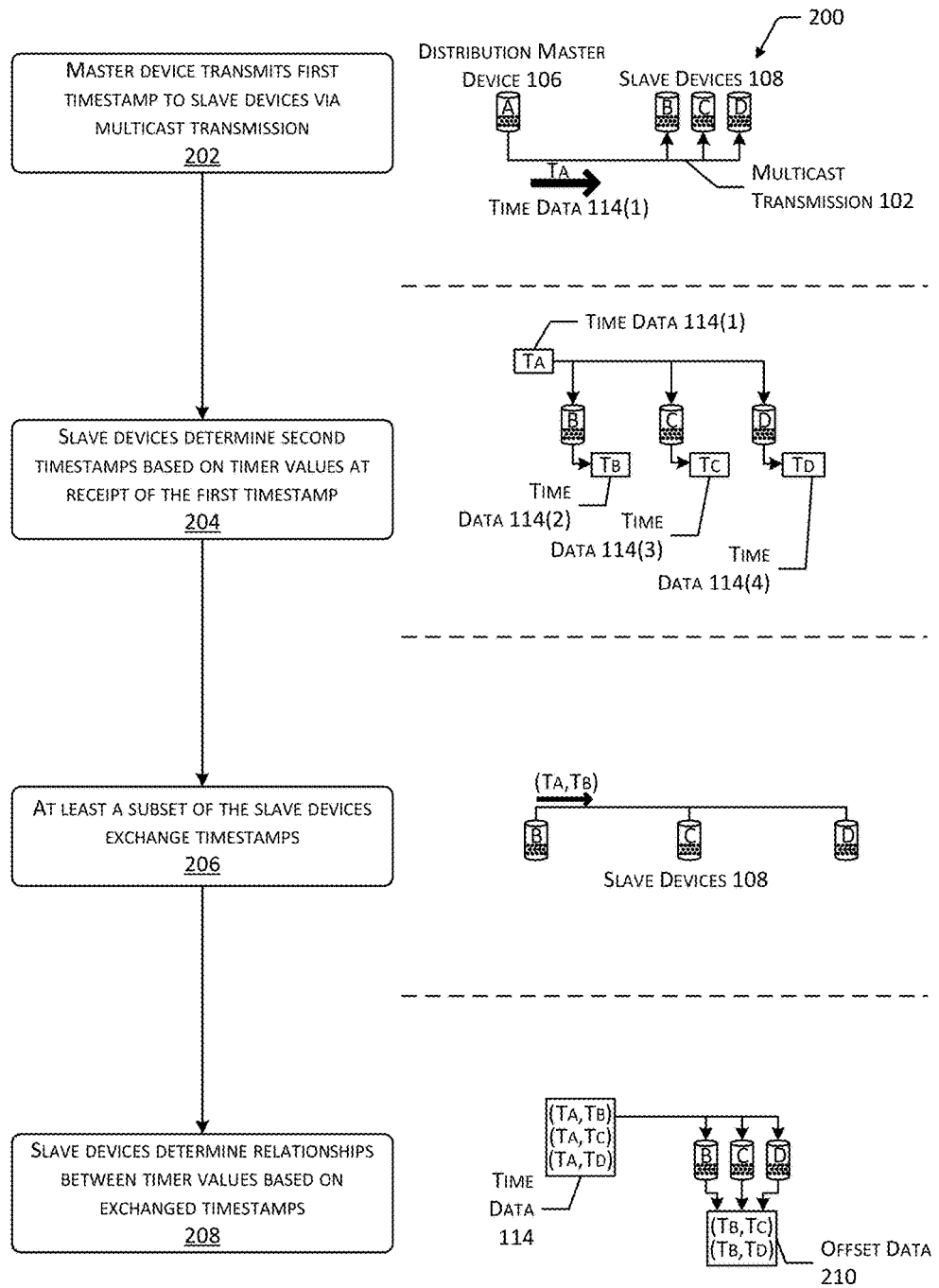
FIG. 2 depicts a scenario illustrating a first process for synchronizing a group of audio devices.

FIG. 2 depicts a scenario 200 illustrating a first process for synchronizing a group of audio devices. At 202, a master device may transmit a first timestamp to one or more slave devices 108 via a multicast transmission 102. For example, a distribution master device 106 configured to transmit audio data to multiple slave devices 108 via one or more multicast transmissions 102 may transmit time data 114(1) to the slave devices 108. The time data 114(1) may include a timestamp indicative of a timer value for the distribution master device 106 at the time that the time data 114(1) was transmitted.

At 204, the slave devices 108 may determine second timestamps based on the timer values of the slave devices 108 at the time that the first timestamp was received from the distribution master device 106. For example, each slave device 108 may include a clock or other type of timer device. The timer device for each slave device 108 may indicate a different timer value based on the time at which each respective slave device 108 was activated and the characteristics of the timer device, such as the type or frequency of crystal or other components thereof. Each slave device 108 may therefore determine a respective timestamp based on the respective timer value of that slave device 108 at the time that the time data 114(1) was received. For example, FIG. 2 depicts a first slave device 108 "B" determining second time data 114(2) indicative of a timestamp "Tb", a second slave device 108 "C" determining third time data 114(3) indicative of a timestamp "Tc", and a third slave device 108 "D" determining fourth time data 114(4) indicative of a timestamp "Td".

At 206, at least a subset of the slave devices 108 may exchange one or more determined timestamps. For example, upon receipt of the first timestamp from the master device, a slave device 108 determine a second timestamp based on a current timer value at the time the first timestamp was received, then store the first and second timestamps as an ordered pair having the format "(Ta,Tb)". To synchronize the slave devices 108 relative to at least one audio device (e.g., the local synchronization master device 112), at least one of the slave devices 108 may provide the determined timestamps to each other slave device 108. For example, FIG. 2 depicts a first slave device 108 "B" providing a set of timestamps "(Ta,Tb)" to the other slave devices 108. By providing the set of timestamps to each of the other slave devices 108, the other slave devices 108 can determine relationships between the respective timer values of the other slave devices 108 and the timer value of the slave device 108 that provided the timestamps, enabling the slave device 108 that provided the timestamps to function as the local synchronization master device 112. In other implementations, other slave devices 108, such as the second slave device 108 "C" or the third slave device 108 "D" may provide sets of timestamps (e.g., "(Ta, Tc)" or "(Ta, Td)" to one or more other slave devices 108). In some implementations, slave devices 108 may provide time data 114(2) to other slave devices 108 via one or more unicast transmissions 110. In other implementations, slave devices 108 may provide time data 114(2) to other slave devices 108, and in some implementations to the distribution master device 106, via one or more multicast transmissions 102. In still other implementations, slave devices 108 may provide time data 114(2) to other slave devices 108 via communication links with one or more access points 104. In other implementations, slave devices 108 may provide time data 114(2) to the distribution master device 106. The distribution master device 106 may, in turn, transmit the received time data 114(2) to each of the slave devices 108 via one or more multicast transmissions 102 or one or more unicast transmissions 110.

At 208, the slave devices 108 may determine relationships between their respective timer values based on the exchanged timestamps. For example, after receiving timestamps from the slave device 108 "B", having the format of an ordered pair indicating the first timestamp and the second timestamp (e.g., "(Ta,Tb)"), other slave devices 108 may store the received timestamps and the time data 114 based on receipt of the first time data 114(1) in a table or similar data structure. By performing a join operation or similar function using the first timestamp ("Ta") as a key value, a slave device 108 may determine offset data 210 indicating the relationships between the timestamps of the slave devices 108. For example, because each slave device 108 received the first timestamp form the distribution master device 106 as part of a simultaneous event (e.g., a multicast transmission 102), the difference between the timer values of the slave devices 108 at the time that the first timestamp was received may be used to determine offsets or delays to synchronize the output of content. In some implementations, the offset data 210 may include ordered pairs of timestamps for respective pairs of slave devices 108 (e.g., "(Tb, Tc)" and "(Tb, Td)"). The offset data 210 may be used to synchronize the slave devices 108 relative to one another, such as by determining an offset between each slave device 108 and the local synchronization master device 112.

Figure 3:
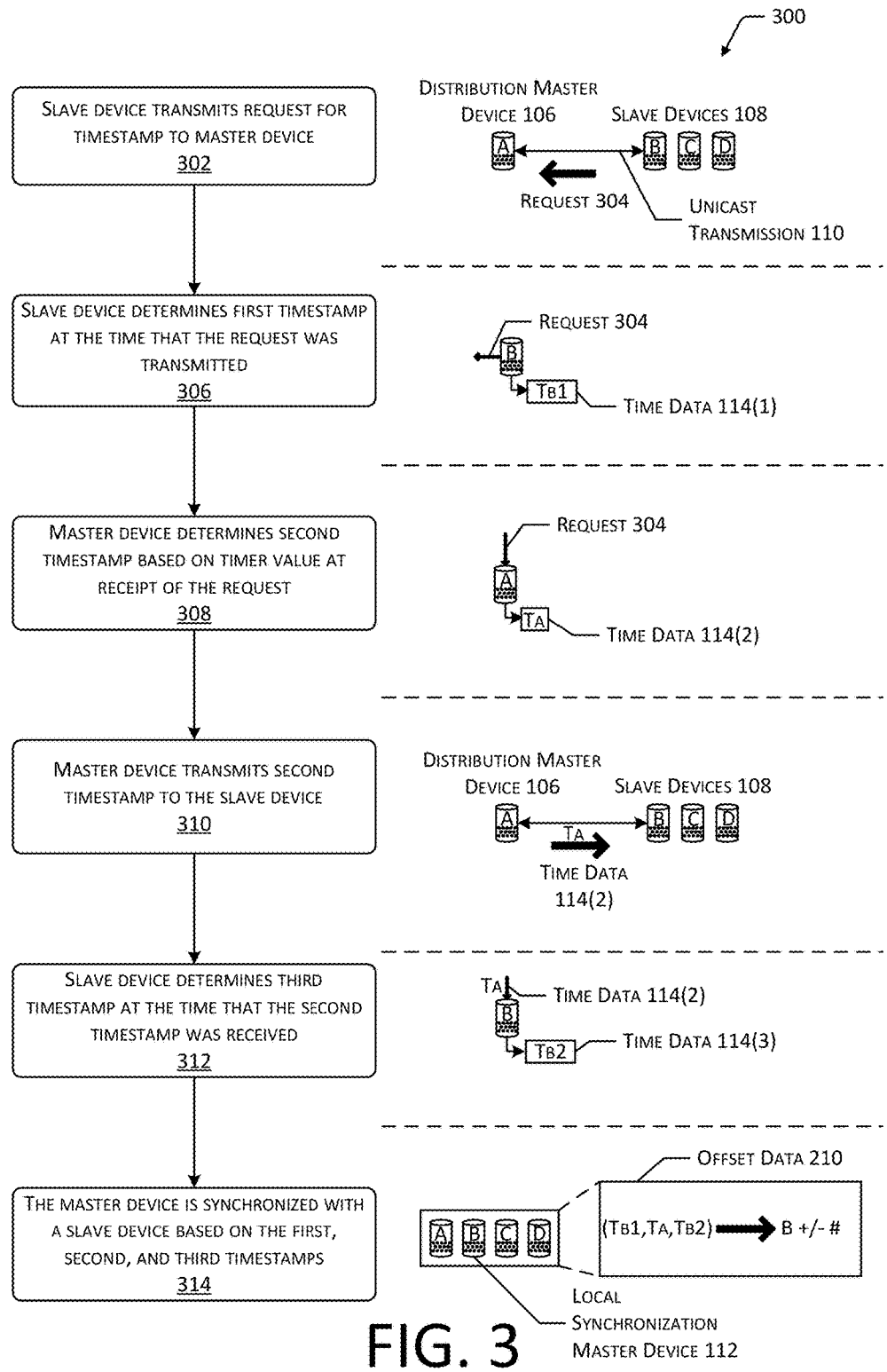
FIG. 3 depicts a scenario illustrating a second process for synchronizing a group of audio devices.

FIG. 3 depicts a scenario 300 illustrating a second process for synchronizing a group of audio devices. For example, the process illustrated in FIG. 2 may be used to synchronize multiple slave devices 108 relative to one another, while the process in FIG. 3 may be used to synchronize a distribution master device 106 with one or more of the slave devices 108. At 302, a slave device 108, such as the local synchronization master device 112, may transmit a request 304 for a timestamp to the master device. For example, a particular slave device 108 may provide a request 304 to the distribution master device 106 via a unicast transmission 110. In other implementations, the slave device 108 may provide the request 304 via a multicast transmission 102 or via a communication link with one or more access points 104.

At 306, the slave device 108 that provided the request 304 may determine a first timestamp indicative of a timer value at the time that the request 304 was transmitted. For example, the slave device 108 may generate or store first time data 114(1) indicative of the timer value at the time that the request 304 was provided to the distribution master device 106.

At 308, the master device may determine a second timestamp based on the timer value at the time that the master device received the request 304 from the slave device 108. For example, the master device may include a clock or other type of timer device, which may indicate a different timer value than that of the slave devices 108, based on the time at which the master device was activated and the characteristics of the timer device. The master device may determine time data 114(2) that includes a timestamp representing a time value of the master device at the time that the request 304 was received from the slave device 108.

At 310, the master device may transmit the second timestamp to the slave device 108 that provided the request 304. For example, the distribution master device 106 may generate second time data 114(2), indicative of the second timestamp, and may transmit the second time data 114(2) to the slave device 108 via a unicast transmission 110. In other implementations, the distribution master device 106 may provide the second time data 114(2) to the slave device 108 via one or more multicast transmissions 102 or via a communication link with one or more access points 104.

At 312, the slave device 108 may determine a third timestamp at the time that the second timestamp was received from the distribution master device 106. For example, the slave device 108 may generate third time data 114(3) indicative of a timer value at the time that the second time data 114(2) was received from the distribution master device 106. In some implementations, the timestamps received and determined by the slave device 108 may be expressed as an ordered triplet indicating the first timestamp determined by the slave device 108, the timestamp received from the distribution master device 106, and the second timestamp determined by the slave device 108 (e.g., "(Tb1, Ta,Tb2)"), which may be referred to as offset data 210. Based on the first, second, and third timestamps, the slave device 108 may determine a relationship between the timer value of the slave device 108 and that of the distribution master device 106. In some implementations, one or more of the first, second, or third timestamps may be provided to one or more of the other slave devices 108.

In some implementations, the audio devices may be configured to determine offset data 210 periodically or continuously. For example, after determining multiple sets of timestamps over a period of time, the distribution master device 106 may transmit multiple sets of timestamps, such as via a bulk or batch process, to the slave devices 108 that provided the request 304.

At 314, the distribution master device 106 and the slave device 108 that provided the request 304 may be synchronized based on the first, second, and third timestamps. For example, based on the offset data 210 and the timestamps determined via the process illustrated in FIG. 2, each slave device 108 may be synchronized relative to a local synchronization master device 112. Using the process illustrated in FIG. 3, the distribution master device 106 may also be synchronized relative to the local synchronization master device 112.

Figure 4:
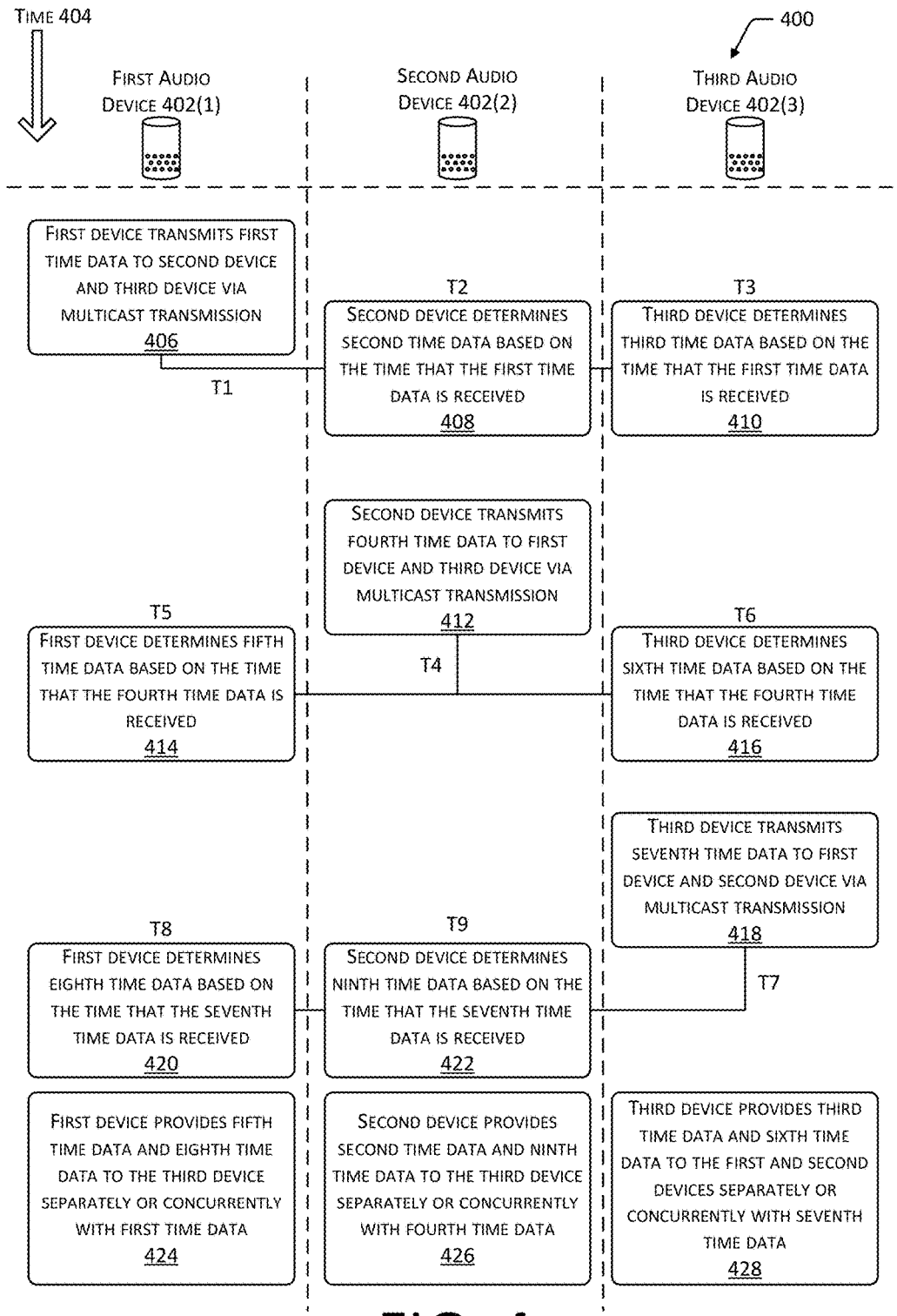
FIG. 4 illustrates a method for synchronizing multiple audio devices using successive multicast transmissions.

FIG. 4 illustrates a method 400 for synchronizing multiple audio devices 402 using successive multicast transmissions 102. Specifically, FIG. 4 illustrates a first audio device 402(1), a second audio device 402(2), and a third audio device 402(3), each of which are configured to communicate with the other audio devices 402 via multicast transmissions 102. For example, the audio devices 402 may include the slave devices 108 depicted in FIG. 1. Continuing the example, each audio device 402 may be configured to transmit data to a distribution master device 106 which may in turn provide the data to the other audio devices 402 via a multicast transmission 102. One implementation of the passage of time is indicated by the vertical position of elements within FIG. 4, as indicated by the arrow 404.

At 406, a first audio device 402(1) may transmit first time data 114 to a second audio device 402(2) and a third audio device 402(3) via a multicast transmission 102. The first time data 114 may include a timestamp indicative of a timer value for the first audio device 402(1) at or proximate to the time that the first time data 114 was transmitted.

Subsequent to transmission of the first time data 114, at 408, the second audio device 402(2) may determine second time data 114 based on the time that the first time data 114 was received. At 410, the third audio device 402(3) may determine third time data 114 based on the time that the first time data 114 was received. The second time data 114 and third time data 114 may include timestamps indicative of timer values for the second audio device 402(2) and third audio device 402(3), respectively, at or proximate to the time that the first time data 114 was received. The second audio device 402(2) may receive the first time data 114 prior to receipt of the first time data 114 by the third audio device 402(3), subsequent to receipt of the first time data 114 by the third audio device 402(3), or at or proximate to the same time that the third audio device 402(3) received the first time data 114.

At 412, the second audio device 402(2) may transmit fourth time data 114 to the first audio device 402(1) and the third audio device 402(3) via a multicast transmission 102. The fourth time data 114 may include a timestamp indicative of a timer value for the second audio device 402(2) at or proximate to the time that the fourth time data 114 was transmitted. In some implementations, the second audio device 402(2) may also transmit data indicative of the second time data 114 to one or more of the first audio device 402(1) or the third audio device 402(3). For example, the second audio device 402(2) may transmit an indication of the relationship between a timestamp received from the first audio device 402(1) and the timestamp indicative of the timer value for the second audio device 402(2) at or near the time that the first timestamp was received.

At 414, the first audio device 402(1) may determine fifth time data 114 based on the time that the fourth time data 114 is received from the second audio device 402(2). At 416, the second audio device 402(2) may determine sixth time data 114 based on the time that the fourth time data 114 is received from the second audio device 402(2). The fifth and sixth time data 114 may include timestamps indicative of timer values at the time that the fourth audio data 114 was received by the respective audio devices 402. The first audio device 402(1) may receive the fourth time data 114 prior to receipt of the fourth time data 114 by the third audio device 402(3), subsequent to receipt of the fourth time data 114 by the third audio device 402(3), or at or proximate to the same time that the third audio device 402(3) received the first time data 114.

In some implementations, at 418, the third audio device 402(3) may transmit seventh time data 114 to the first audio device 402(1) and the second audio device 402(2) via a multicast transmission 102. While the transmission of the first time data at 406 and the fifth time data at 414 may be sufficient to synchronize the audio devices 402, transmission of additional time data 114 by the third audio device 402(3) may improve the accuracy and convergence of the synchronization process. The seventh time data 114 may include a timestamp indicative of a timer value for the third audio device 402(2) at or proximate to the time that the seventh time data 114 was transmitted. In some implementations, the third audio device 402(3) may also transmit data indicative of one or more of the third time data or the sixth time data to the other audio devices 402. For example, the third audio device 402(3) may transmit an indication of the relationship between a timestamp received from the first audio device 402(1) and the timestamp indicative of the timer value for the third audio device 402(3) at or near the time that the first timestamp was received. The third audio device 402(2) may also transmit an indication of the relationship between a timestamp received from the second audio device 402(2) and the timestamp indicative of the timer value for the third audio device 402(3) at or near the time that the second timestamp was received.

At 420, the first audio device 402(1) may determine eighth time data 114 based on the time that the seventh time data 114 was received from the third audio device 402(3). At 422, the second audio device 402(2) may determine ninth time data 114 based on the time that the seventh time data 114 was received from the third audio device 402(3). The eighth time data 114 and ninth time data 114 may include timestamps indicative of timer values for the first audio device 402(1) and second audio device 402(2), respectively, at or proximate to the time that the seventh time data 114 was received.

At 424, the first audio device 402(1) may provide one or more of the fifth time data 114 or the eighth time data 114 to the third audio device 402(3). In some implementations, data indicative of the fifth time data 114 and the eighth time data 114 may be provided from the first audio device 402(1) to the third audio devices 402(3) separately, such as via a unicast transmission 110 or a multicast transmission 102 not used to transmit the first time data 114. In other implementations, the first audio device 402(1) may provide data indicative of one or more of the fifth time data 114 or the eighth time data 114 concurrently with the first time data 114. For example, the method 300 depicted in FIG. 3 may be repeated, and at block 406, the first audio device 402(1) may also transmit data indicative of the fifth time data 114 and the eighth time data 114, determined during previous performances of the method 300, to the other audio devices 402. In some implementations, the method 400 depicted in FIG. 4 may be repeated multiple times, and the first audio device 402(1) may determine multiple fifth time data 114 and eighth time data 114. In such cases, the first audio device 402(1) may transmit multiple fifth time data 114 and eighth time data 114, determined over a period of time, in a single transmission.

At 426, the second audio device 402(2) may provide one or more of the second time data 114 or the ninth time data 114 to the third audio device 402(3). In some implementations, data indicative of the second time data 114 or the ninth time data 114 may be provided to third audio device 402(3) via a separate unicast transmission 110. In other implementations, the second audio device 402(2) may provide one or more of the second time data 114 or the ninth time data 114 to the third audio device 402(3) concurrent with the fourth time data 114. For example, block 412 may include also transmitting one or more of the second time data 114 or the ninth time data 114 to the first and third audio devices 402. In some implementations, the method 400 depicted in FIG. 4 may be repeated multiple times, the second audio device 402(2) may determine second time data 114 and ninth time data 114 on multiple occasions, and the second audio device 402(2) may transmit multiple second time data 114 and ninth time data 114, determined over a period of time, in a single transmission.

At 428, the third audio device 402(3) may provide one or more of the third time data 114 or the sixth time data 114 to the first audio device 402(1) and the second audio device 402(2). In some implementations, data indicative of the third time data 114 or the sixth time data 114 may be provided to the first audio device 402(1) or the second audio device 402(2) via one or more separate unicast transmissions 110 or multicast transmissions 102. In other implementations, the third audio device 402(3) may provide one or more of the third time data 114 or the sixth time data 114 to one or more of the first audio device 402(1) or the second audio device 402(2) concurrent with the seventh time data 114. For example, block 418 may include transmitting data indicative of one or more of the third time data 114 or the sixth time data 114 in addition to transmitting the seventh time data 114. In some implementations, the method 400 depicted in FIG. 4 may be repeated multiple times, the third audio device 402(3) may determine third time data 114 and sixth time data 114 on multiple occasions, and the third audio device 402(3) may transmit multiple third time data 114 and sixth time data 114, determined over a period of time, in a single transmission.

Figure 5:
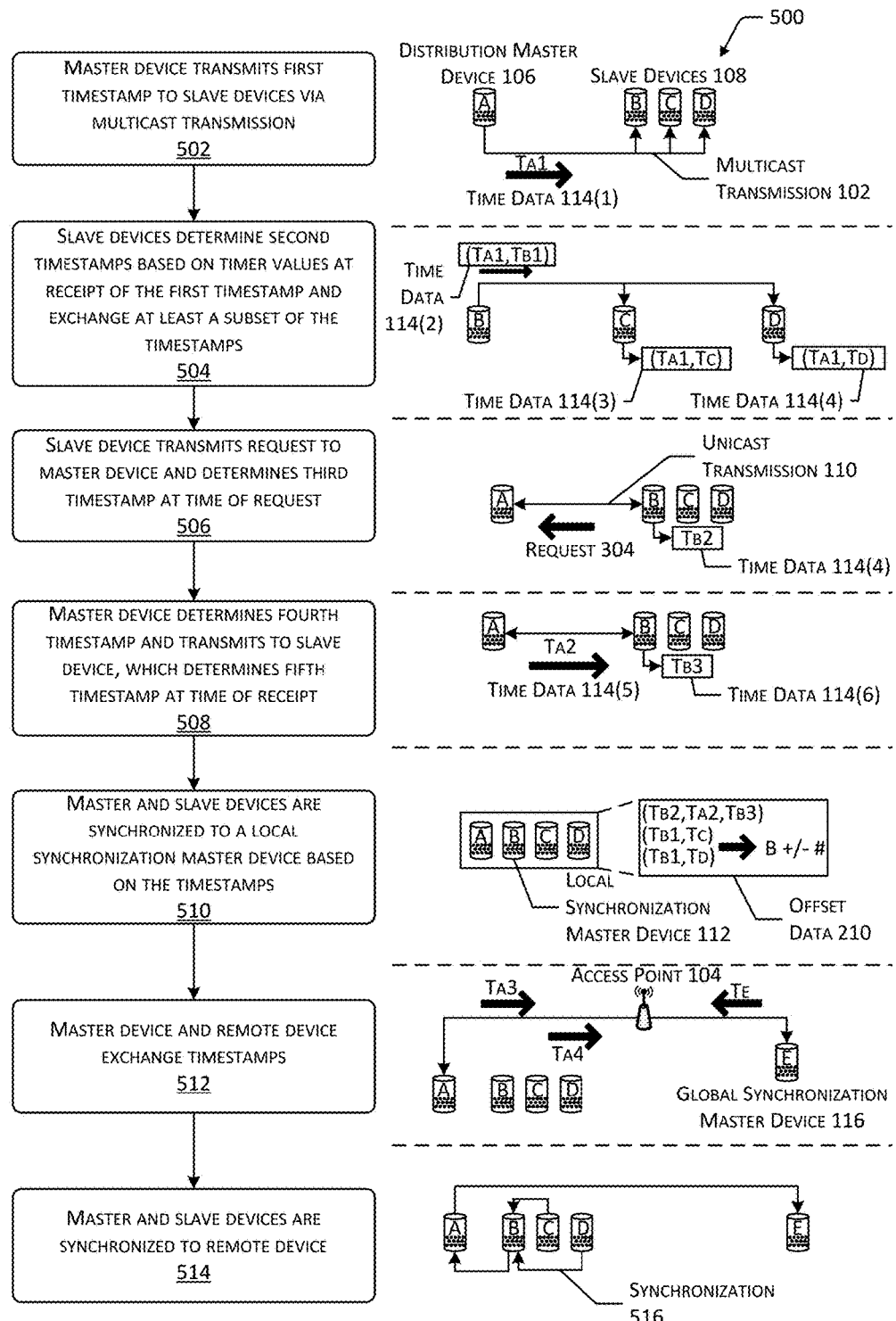
FIG. 5 depicts a scenario illustrating a method for synchronizing a group of audio devices in which one or more of the audio devices communicates with one or more other audio devices via an access point.

FIG. 5 depicts a scenario 500 illustrating a method for synchronizing a group of audio devices 402 in which one or more of the audio devices 402 communicates with one or more other audio devices 402 via an access point 104. At 502, a master device transmits a first timestamp to one or more slave devices 108 via a multicast transmission 102. For example, a distribution master device 106 may be configured to receive audio data from an access point 104 and transmit the audio data to one or more slave devices 108 via one or more multicast transmissions 102. The distribution master device 106 may also be used to synchronize the slave devices 108 relative to one another by providing time data 114(1) to the slave devices 108 via a multicast transmission 102. Transmission of the time data 114(1) to the slave devices 108 may function as a simultaneous event by which the slave devices 108 may determine corresponding timer values.

For example, at 504, the slave devices 108 may determine and exchange second time stamps based on their respective timer values at the time that the first timestamp was received from the distribution master device 106. In some cases, each slave device 108 may include a clock or other type of timer device having a value that is set to zero at the time that the device is activated, then increments forward at particular intervals based on characteristics of the timer device. Thus, at the time that the time data 114(1) is received by the slave devices 108, the timer value for each slave device 108 may differ from one another and from the timer value for the distribution master device 106. A first slave device 108 "B" may determine second time data 114(2) indicative of the timer value at the time that the first time data 114(1) was received. A second slave device 108 "C" may determine third time data 114(3) indicative of the timer value at the time that the first time data 114(1) was received. A third slave device 108 "D" may determine fourth time data 114(4) indicative of the timer value at the time that the first time data 114(1) was received. At least one slave device 108 may transmit one or more determined timer values to one or more other slave devices 108. For example, a particular slave device 108 "B" may provide the second time data 114(2) to one or more of the other slave devices 108 to enable the other slave device(s) 108 to determine a relationship between the timer value of the particular slave device 108 and that of the other slave device(s) 108. In some implementations, the timer values for a slave device 108 may be transmitted to one or more other slave devices 108 via unicast or multicast transmissions through the distribution master device 106. Based on the differences between determined timer values for the slave device 108, the slave devices 108 may be synchronized relative to one another. For example, a slave device 108 may store the timer values determined by each slave device 108 and the timestamp provided by the distribution master device 106 in a table or similar data structure. The timer value for the distribution master device 106 may be used as a key for a joining operation to associate timer values for the slave devices 108 with one another.

At 506, a slave device 108 may transmit a request 304 for a timestamp to the distribution master device 106 and may determine a third timestamp at the time of the request 304. For example, the slave device 108 may generate fourth time data 114(4) indicative of the timer value for the slave device 108 at the time the request 304 was transmitted.

At 508, the master device may determine a fourth timestamp indicative of the timer value at the time when the request 304 is received from the slave device 108. The master device may transmit fifth time data 114(5) indicative of the determined timestamp to the slave device 108 via a unicast transmission 110 or in other implementations, a multicast transmission 102. The slave device 108 may determine sixth time data 114(6) indicative of a fifth timestamp at the time that the fifth time data 114(5) is received from the distribution master device 106.

At 510, the distribution master device 106 and slave devices 108 may be synchronized to a local synchronization master device 112 based on the timestamps. For example, based on offset data 210 indicative of paired timestamps received from one or more of the audio devices 402, skew and drift values may be calculated for each audio device 402 relative to a selected audio device 402, designated as the local synchronization master device 112.

In some cases, a group of audio devices configured to transmit or receive multicast transmissions 102 may be used to generate a synchronized output with one or more other audio devices that communicate with the group of audio devices via an access point 104. For example, at 512, FIG. 5 depicts the distribution master device 106 and a remote device exchanging timestamps via an access point 104. In some implementations, the remote audio device 402 "E" may provide time data 114 or a request 304 for time data 114 to the distribution master device 106 and may determine a timer value at the time that the time data 114 or request 304 was sent. The distribution master device 106 may determine a current timer value at or proximate to the time that the communication from the remote audio device 402 is received. The distribution master device 106 may then provide an indication of the determined timer value to the remote audio device 402, which may determine an additional timer value at the time that the data is received from the distribution master device 106. In other implementations, the distribution master device 106 may provide an initial request 304 or time data 114 to the remote audio device 402, determine a timer value at the time the request 304 or time data 114 is sent, then determine a second timer value at the time that a responsive timer value is received from the remote audio device 402. While FIG. 5 depicts a single remote audio device 402, in other implementations, the remote audio device 402 may also function as a distribution master device 106 for a second group of slave devices 108. Additionally, while FIG. 5 depicts a single remote audio device 402, in other implementations, multiple audio devices 402 may communicate with the distribution master device 106 via the access point 104.

One of the remote audio device 402 or the distribution master device 106 may be designated as a global synchronization master device 116. Each of the other audio devices 402 may be synchronized relative to the global synchronization master device 116. For example, at 514, FIG. 5 depicts the distribution master device 106 and the corresponding slave devices 108 undergoing a synchronization 516 process with regard to the remote audio device 402, designated as the global synchronization master device 116. Because each of the slave devices 108 and the distribution master device 106 are synchronized relative to the local synchronization master device 112, differences between timer values for each of the audio devices 402 may be maintained when synchronizing the distribution master device 106 with the global synchronization master device 116.

Figure 6:
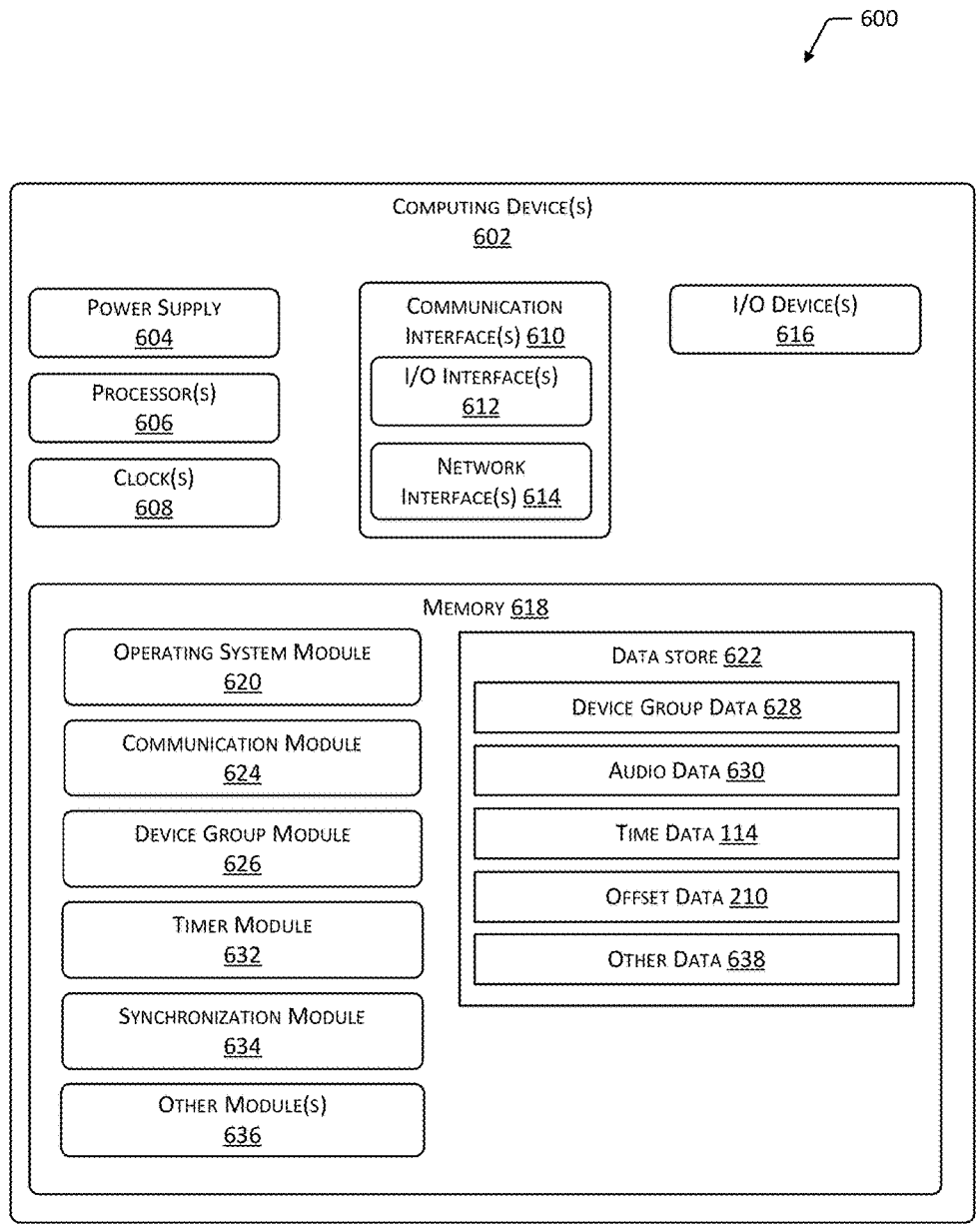
FIG. 6 is a block diagram depicting an implementation of one or more computing devices within the scope of the present disclosure.

FIG. 6 is a block diagram 600 depicting an implementation of one or more computing devices 602 within the scope of the present disclosure. While FIG. 6 depicts a single block diagram 600, the depicted computing device 602 may include any number of computing devices 602 and any type of computing devices 602. For example, the depicted computing device(s) 602 may include one or multiple audio devices 402. As another example, the depicted computing device(s) 602 may include one or more servers or other types of computing devices in communication with one or more audio devices 402. As yet another example, the depicted computing device(s) 602 may include a combination of audio devices and other computing devices 602 in communication therewith. In other implementations, the computing device(s) 602 may include devices other than audio devices that are configured to transmit or receive any type of data, such as video data. For example, a computing device 602 may include, without limitation, a server, a desktop, laptop, or other type of personal computer, a smartphone, notebook, tablet computer, palm-top computer, or other type of portable computing devices, a wearable computing device, an automotive computing device, a gaming system, a smart television, a set-top box, and so forth.

The computing device(s) 602 may include one or more power supplies 604 configured to provide electrical power suitable for operating the components of the computing device(s) 602. In some implementations, the power supply 604 may include a rechargeable battery, fuel cell, photovoltaic cell, power conditioning circuitry, and so forth.

The computing device(s) 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock(s) 608 to generate a timestamp, trigger a preprogrammed action, and so forth. Continuing the example, a timer value associated with the clock(s) 608 may be used to synchronize a particular computing device 602 relative to one or more other computing devices 602.

The computing device(s) 602 may include one or more communication interfaces 610, such as input/output (I/O) interfaces 612, network interfaces 614, and so forth. The communication interfaces 610 may enable the computing device(s) 602, or components thereof, to communicate with audio devices and other computing devices 602, or components thereof. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device(s) 602. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O devices 616 may be physically incorporated with a computing device 602 or may be externally placed.

The network interfaces 614 may be configured to provide communications between the computing device(s) 602 and other devices, such as the I/O devices 616, routers, access points 104, and so forth. The network interfaces 614 may include devices configured to couple to one or more networks including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device(s) 602 may include one or more busses or other internal communications hardware or software that allows for the transfer of data between the various modules and components of the computing device(s) 602.

As shown in FIG. 6, the computing device(s) 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device(s) 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with audio devices 402, servers, external devices, or other computing devices 602. For example, the communication module 624 may be used to transmit and receive timestamps or other data to or from other computing devices 602.

The memory 618 may also store a device group module 626. The device group module 626 may access device group data 628 that indicates one or more audio devices 402 to be used to provide an audio output. In some implementations, the device group module 626 may be configured to provide a user interface, receive user input indicative of one or more audio devices, and store the user input as device group data 628. For example, user input may be used to select particular audio devices for use providing an audio output. Continuing the example, a user may select a group of audio devices located within a particular room of a dwelling, a group of audio devices located on the first floor of a dwelling, or all of the audio devices associated with the dwelling to provide a particular audio output. Device identifiers indicative of the audio devices selected for each group may be stored as device group data 628. In some implementations, the user interface may also receive user input indicative of the audio data 630 to be used to generate the audio output. For example, the audio data 630 may include one or more of an application or audio content that may be used to cause one or more audio devices 402 to emit sound. In other implementations, the device group data 628 may include preexisting, default data indicating one or more audio devices 402. In still other implementations, the device group module 626 may be configured to generate device group data 628 based on characteristics of the audio data 630 or one or more of the audio devices 402.

The memory 618 may also include a timer module 632. The timer module 632 may be configured to determine values associated with the clock(s) 608 and generate time data 114 based on the values. For example, when a first timestamp is received from another computing device, the timer module 632 may determine a current value associated with the clock(s) 608 at or near the time that the first timestamp is received and cause the clock(s) 608 to generate a second timestamp indicative of the value. Received timestamps and generated timestamps may be stored, such as in the format of ordered pairs of values within a table or other type of data structure.

The memory 618 may additionally store a synchronization module 634. The synchronization module 634 may determine offset data 210 based on the time data 114 generated by the timer module 632 and received from other computing devices 602. For example, the time data 114 may include timestamps received from other computing devices 502, indicative of times that the timestamps were transmitted, stored in association with corresponding timestamps determined by the computing device 602 indicative of times that the timestamps were received from the other computing devices 602. The time data 114 may also include pairs of timestamp values received from other computing devices 602. For example, after determining a timestamp responsive to a received timestamp, a computing device 602 may transmit data indicative of the received and determined timestamps to other computing devices 602. In some implementations, such transmissions may include bulk or batch transmissions that transmit multiple pairs of timestamps to one or more other computing devices 602.

Based on the offset data 210, the synchronization module 634 may determine differences between timer values for particular computing devices 602 and control the timing of an output based on the differences. For example, a particular computing device 602 may be designated as a synchronization master device, and the difference between the timer values for the synchronization master device and each other computing device 602 within a group may be used to synchronize the output.

The synchronization module may generate and store offset data 210 for multiple groups of devices. For example, a particular computing device 602 may be associated with multiple device groups. Continuing the example, an audio device 402 located in the living room of a dwelling may be associated with a first group consisting of all audio devices 402 within the living room, a second group consisting of all audio devices 402 located on the first floor of the dwelling, and a third group consisting of all audio devices 402 within the dwelling. For each group of devices, a different time synchronization master device may be used, and different offset values may be determined based on the time data 114 associated with each device within the group. Computing devices 602 may transmit and receive time data 114 periodically, such as once every 100 ms, once every minute, or using another period of time, such that at the time that user input associated with a group of devices and an output is received, the computing devices 602 within the group may already be synchronized.

Other modules 636 may also be present in the memory 618. For example, encryption modules may be used to encrypt and decrypt communications between computing devices 602. The other modules 636 may also include modules for receiving user input to configure parameters of computing devices 602. Other modules 636 may additionally include modules used control characteristics of an output based on the synchronization of the output, characteristics of the computing devices 602, and so forth, such as by modifying a volume of particular audio signals or providing particular portions of content to particular computing devices 602 for output of respective portions of content by different devices.

Other data 638 within the data store 622 may include user input data, such as configurations and settings associated with computing devices 602. Other data 638 may also include security data, such as encryption keys and schema, access credentials, and so forth. Other data 638 may additionally include rules, algorithms, and so forth used to synchronize and control audio output, such as by determining time delays between the emissions of sounds based on the locations of audio devices.

In different implementations, different computing devices 602 may have different capabilities or capacities. For example, servers may have significantly more processor 606 capability and memory 618 capacity compared to the processor 606 capability and memory 618 capacity of audio devices 402.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first audio device;
   a second audio device;
   a third audio device, wherein the first audio device is configured to provide audio data to the second audio device and the third audio device via multicast transmissions;
   one or more memories storing computer-executable instructions; and
   one or more hardware processors to execute the computer-executable instructions to:
   send, by the first audio device, first time data to the second audio device and the third audio device via a multicast transmission;
   determine, by the second audio device, second time data indicative of a time at which the first time data was received by the second audio device;
   determine, by the third audio device, third time data indicative of a time at which the first time data was received by the third audio device;
   send, by the third audio device, the first time data and the third time data to the second audio device;

determine, by the second audio device, that the first time data generated by the first audio device corresponds to the first time data received from the third audio device;

determine, by the second audio device, first offset data indicative of a difference between the second time data and the third time data;

send, by the second audio device, a first request for time data to the first audio device;

determine, by the second audio device, fourth time data indicative of a time at which the first request was sent by the second audio device;

determine, by the first audio device, fifth time data indicative of a time at which the first request was received;

send, by the first audio device, the fifth time data to the second audio device;

determine, by the second audio device, sixth time data indicative of a time at which the fifth time data was received;

determine, by the second audio device, second offset data indicative of a difference between the fourth time data and the fifth time data and a difference between the fifth time data and the sixth time data;

determine, based on the first offset data and the second offset data, third offset data indicative of a difference between the first time data and the third time data; and output audio using the first audio device, the second audio device, and the third audio device, wherein a first timing of audio output of the third audio device is based on the third offset data and a second timing of audio output of the second audio device is based on the second offset data.

2. The system of claim 1, further comprising computer-executable instructions to:

send, by the second audio device, the first time data and the second time data to the third audio device;

wherein the first offset data is determined by each of the second audio device and the third audio device.

3. The system of claim 1, further comprising computer-executable instructions to:

determine, by the third audio device, a plurality of the first time data and a plurality of the third time data over a period of time;

subsequent to the period of time, provide the plurality of the first time data and the plurality of the third time data from the third audio device to the second audio device; and provide an indication of the third offset data from the second audio device to the third audio device.

4. The system of claim 1, further comprising:

a fourth audio device;

an access point in communication with the first audio device and the fourth audio device; and computer-executable instructions to:

send, by the fourth audio device, a second request for time data to the first audio device;

determine, by the fourth audio device, seventh time data indicative of a time at which the second request was sent;

determine, by the first audio device, eighth time data indicative of a time at which the first audio device received the second request;

send, by the first audio device, the eighth time data to the fourth audio device;

determine, by the fourth audio device, ninth time data indicative of a time that the eighth time data was received by the fourth audio device;

determine, using the fourth audio device, fourth offset data indicative of a difference between the seventh time data and the eighth time data and a difference between the eighth time data and the ninth time data; and output the audio using the fourth audio device, wherein a third timing of audio output using the fourth audio device is based on the fourth offset data.

5. A method comprising:

determining first time data indicative of a time at which an event associated with a first device is detected by a second device;

determining second time data indicative of a time at which the event is detected by a third device;

determining first offset data based on a difference between the first time data and the second time data;

sending, by the second device, a request to the first device;

determining, by the second device, third time data indicative of a time at which the request was sent to the first device;

sending, by the first device to the second device, fourth time data indicative of a time at which the request was received by the first device;

determining fifth time data indicative of a time at which the second device received the fourth time data;

determining second offset data based on one or more differences between the third time data, the fourth time data, and the fifth time data; and causing the first device, the second device, and the third device to perform a synchronized action, wherein a first timing associated with the second device is based on the first offset data and a second timing associated with the third device is based on the first offset data and the second offset data.

6. The method of claim 5, wherein the event includes receiving, by the second device and the third device, sixth time data, from the first device, via a multicast transmission, wherein the sixth time data is indicative of a time at which the sixth time data was sent, and wherein the determining of the first offset data further includes:

determining that the time indicated by the sixth time data received by the first device corresponds to the time indicated by sixth time data received by the second device; and based on the correspondence between the sixth time data received by the first device and the sixth time data received by the second device, determining that the first time data is associated with the second time data.

7. The method of claim 5, further comprising sending one or more of the fourth time data or the sixth time data to the first device and the third device, wherein the first offset data is further determined based in part on the one or more of the fourth time data or the sixth time data.

8. The method of claim 5, further comprising:

sending the first time data to the third device; and sending the second time data to the second device;

wherein the first offset data is determined by each of the first device and the second device.

9. The method of claim 5, further comprising:

sending, by the second device, the second time data to the third device, wherein the second time data includes a first timestamp indicative of a time at which the first time data was transmitted by the first device and a second timestamp indicative of a time at which the first
time data was received by the second device; and sending, by the third device, the third time data to the
second device, wherein the third time data includes the
first timestamp and a third timestamp indicative of a
time at which the first time data was received by the
third device;

wherein the determining the first offset data includes:
determining that the first timestamp received by the
second device corresponds to the first timestamp
received by the third device; and
based on the correspondence between the first timestamp received by the second device and the first
timestamp received by the third device, determining
a difference between the second timestamp and the
third timestamp.

10. The method of claim 5, further comprising determining a plurality of third time data and a plurality of fifth time data; and
sending, by the first device, the plurality of the third time data and the plurality of the fifth time data to one or more of the second device or the third device in a single transmission.

11. The method of claim 5, further comprising:
sending, by the first device, a request for time data to a fourth device via an access point in communication with the first device and the fourth device;
determining seventh time data indicative of a time at which the request was sent;
determining eighth time data indicative of a time at which the request was received by the fourth device;
sending, by the fourth device, the eighth time data to the first device;
determining ninth time data indicative of a time at which the eighth time data was received by the first device;
determining third offset data based on one or more differences between the seventh time data, the eighth time data, and the ninth time data; and
performing the synchronized action using the fourth device, wherein a third timing associated with the fourth device is based in part on the third offset data.

12. The method of claim 5, further comprising:
sending, by a fourth device, a request for time data to the first device via an access point in communication with the first device and the fourth device;
determining seventh time data indicative of a time at which the request was sent;
determining eighth time data indicative of a time at which the request was received by the first device;
sending, by the first device, the eighth time data to the fourth device;
determining ninth time data indicative of a time at which the eighth time data was received by the fourth device;
determining third offset data based on one or more differences between the seventh time data, the eighth time data, and the ninth time data; and
performing the synchronized action using the fourth device, wherein a third timing associated with the fourth device is based in part on the third offset data.

13. A system comprising:
an access point;
a first device in communication with the access point;
a second device in communication with the access point;
a third device in communication with the second device;
one or more memories storing computer-executable instructions; and
one or more hardware processors to execute the computer-executable instructions to:
send, by the first device, a request for time data to the second device via the access point;
determine first time data indicative of a time at which the request was sent by the first device;
determine second time data indicative of a time at which the request was received by the second device;
send, by the second device, the second time data to the first device;
determine third time data indicative of a time at which the second time data was received by the first device;
send, by the second device, fourth time data to the third device;
determine fifth time data indicative of a time at which the fourth time data was received by the third device;
determine first offset data based on one or more differences between the first time data, the second time data, and the third time data;
determine second offset data based in part on a difference between the fourth time data and the fifth time data;
based on the first offset data and the second offset data, determine a first time associated with performance of a synchronized action by the first device relative to the second device and a second time associated with performance of the synchronized action by the third device relative to the second device; and
perform the synchronized action using the first device, the second device, and the third device.

14. The system of claim 13, further comprising a fourth device in communication with the second device, wherein the computer-executable instructions to send the first time data include computer-executable instructions to:
send, by the second device, the fourth time data to the third device and the fourth device via a multicast transmission;
determine sixth time data indicative of a time at which the fourth time data was received by the fourth device;
determine third offset data based on a difference between the fifth time data and the sixth time data; and
determine, based in part on the third offset data, a third time associated with performance of the synchronized action by the fourth device relative to the second device.

15. The system of claim 14, further comprising computer-executable instructions to:
send, by the third device, a request for time data to the second device;
determine seventh time data indicative of a time at which the request was sent;
determine eighth time data indicative of a time at which the request was received by the second device;
send, by the second device, the eighth time data to the third device;
determine ninth time data indicative of a time that the eighth time data was received by the third device; and
determine fourth offset data based on one or more differences between the seventh time data, the eighth time data, and the ninth time data;
wherein the third time is further determined based in part on the fourth offset data.

16. The system of claim 15, further comprising computer-executable instructions to:
determine, by the third device, a plurality of fifth time data;

send a plurality of fourth time data and the plurality of fifth time data to the fourth device in a single transmission, wherein the third offset data is determined by the fourth device; and send an indication of the third offset data from the fourth device to the third device.

17. The system of claim 14, further comprising computer-executable instructions to:

send, by the third device, seventh time data to the second device and the fourth device via a multicast transmission, wherein the ninth time data includes a first timestamp indicative of a time at which the seventh time data was transmitted by the third device; and send, by the fourth device, eighth time data to the second device and the third device via a multicast transmission, wherein the eighth time data includes a second timestamp indicative of a time at which the eighth time data was transmitted by the fourth device;

wherein the first time and the second time are further determined based in part on one or more of the seventh time data or the eighth time data.

18. The system of claim 17, further comprising computer-executable instructions to:

send, by the fourth device, the sixth time data to the third device;

wherein the second time is further determined based in part on the seventh time data and the third time is further determined based in part on the eighth time data.

19. The system of claim 14, further comprising computer-executable instructions to:

send, by the third device, the fourth time data and the fifth time data to the fourth device, wherein the fourth time data includes a first timestamp indicative of a time at which the fourth time data was transmitted by the second device and the fifth time data includes a second timestamp indicative of the time at which the fourth time data was received by the third device;

send, by the fourth device, the fourth time data and the sixth time data to the third device, wherein the sixth time data includes a third timestamp indicative of the time at which the fourth time data was received by the fourth device;

wherein the determining the third offset data includes:

determining that the first timestamp received by the third device corresponds to the first timestamp received by the fourth device; and determining a difference between the second timestamp and the third timestamp.

20. The system of claim 13, further comprising:

a fourth device in communication with the first device; and computer-executable instructions to:

send, by the first device, sixth time data to the fourth device;

determine seventh time data indicative of a time at which the sixth time data was received by the fourth device;

send, by the fourth device, the seventh time data to the first device;

determine, by the first device, eighth time data indicative of a time at which the seventh time data was received by the first device;

determine third offset data based on a difference between the sixth time data and the seventh time data and a difference between the seventh time data and the eighth time data;

based on the third offset data, determine a third time associated with output of the content by the fourth device relative to the first device; and perform the synchronized action using the fourth device.

* * * * *